(12) United States Patent
Netzer

(10) Patent No.: US 8,746,199 B2
(45) Date of Patent: Jun. 10, 2014

(54) VALVE STEM SEAL

(75) Inventor: Jürgen Netzer, Burscheid (DE)

(73) Assignee: Aktiebolaget SKF, Gothenburg (SE)

( * ) Notice: Subject to any disclaimer, the term of this patent is extended or adjusted under 35 U.S.C. 154(b) by 244 days.

(21) Appl. No.: 13/263,799

(22) PCT Filed: Apr. 6, 2010

(86) PCT No.: PCT/EP2010/002152
§ 371 (c)(1),
(2), (4) Date: Oct. 10, 2011

(87) PCT Pub. No.: WO2010/118834
PCT Pub. Date: Oct. 21, 2010

(65) Prior Publication Data
US 2012/0111297 A1    May 10, 2012

(30) Foreign Application Priority Data

Apr. 16, 2009 (DE) .......................... 10 2009 017 599

(51) Int. Cl.
F01L 3/24    (2006.01)

(52) U.S. Cl.
USPC ...................................... 123/188.6; 123/188.2

(58) Field of Classification Search
USPC ........................................................ 123/188.6
See application file for complete search history.

(56) References Cited

U.S. PATENT DOCUMENTS 6,209,504 B1    4/2001 Hegemier et al.

FOREIGN PATENT DOCUMENTS

| DE | 2753996 A1 | 6/1979 |
| EP | 1884630 A1 | 2/2008 |
| JP | 2000329234 A | 11/2000 |
| JP | 2004019852 A | 1/2004 |
| JP | 2005201313 A | 7/2005 |

Primary Examiner — Noah Kamen
(74) Attorney, Agent, or Firm — Bryan Peckjian; SKF USA Inc. Patent Department

(57) ABSTRACT

A valve stem seal for an internal combustion engine includes a seal body having a gas seal assembly spaced from an oil seal assembly in the axial direction of the valve stem seal. The gas seal assembly includes a first gas lip and a second gas lip disposed between the oil seal assembly and the first gas lip.

18 Claims, 2 Drawing Sheets

VALVE STEM SEAL

CROSS-REFERENCE

This application is the US national stage of International Application No. PCT/EP2010/002152 filed on Apr. 6, 2010 which claims priority to German Application No. DE 10 2009 017 599.7 filed on Apr. 16, 2009.

TECHNICAL FIELD

The invention relates to a valve stem seal for an internal combustion engine.

RELATED ART

Valve stem seals include a reinforcement support ring and a seal body disposed at least partially within the reinforcement support ring; an oil lip and a gas lip are formed on the seal body. In order to reduce wear of the valve stem seal, JP 2005201313 A discloses placing a chamber filled with grease on the seal body.

SUMMARY

In one aspect of the present teachings, a valve stem seal is provided, in which the gas lip is subjected to less wear.

In another aspect of the present teachings, a valve stem seal is provided for an internal combustion engine, including a seal body having an oil seal assembly and having a gas seal assembly spaced from the oil seal assembly in the axial direction, the gas seal assembly having a first gas lip and a second gas lip disposed between the oil seal assembly and the first gas lip.

Problems with relatively high wear of the gas lip of a valve stem seal can occur in engines. The gas lip can be subjected, at least temporarily, to a relatively high pressure in engines, which can negatively affect its service life. However, the limited amount of grease in known chambers can contribute to reduction of wear for only a limited time period, and it reaches the functional limits especially at high temperature and pressure loads.

On the other hand, a valve stem seal according to the present teachings preferably includes at least two gas lips; that is, in addition to the first gas lip, the second gas lip may be formed as a further sealing edge, so that the two gas lips form a chamber for retaining lubrication oil. Thus, during operation of a valve associated with the valve stem seal, the oil is directly disposed on the loaded first gas lip, whereby conditions are created for an increased service life.

In order to facilitate the manufacturing of the seal body, the oil seal assembly, which can be embodied, e.g., as an oil lip, the first gas lip and/or the second gas lip preferably can be integrally formed as one piece, in particular from the same material, on the seal body. The seal body can be fabricated from an elastomeric material.

The chamber formed by the two gas lips is only required to be a relatively small chamber; thus, according to a preferred embodiment of the inventive valve stem seal, the two gas lips are spaced by a distance less than or equal to 1 mm.

So that the chamber is capable of accommodating sufficient oil, the two gas lips are spaced from each other by a distance of greater than or equal to 0.2 mm according to one variant of the inventive valve stem seal.

According to an embodiment of the inventive valve stem seal, the two gas lips define the chamber; the maximum diameter of the chamber is about 0.2 mm to 1 mm, preferably 0.5 mm, larger than the diameter of the second gas lip. It is thereby ensured that the chamber is formed not too large, which positively affects the lubrication behavior, contingent upon the oil accommodated by the chamber.

In order to reduce the wear of the inventive valve stem seal, according to one variant, the diameter of the first gas lip and the diameter of the second gas lip are set such that the first gas lip abuts on a valve stem associated with the valve stem seal with a relatively high sealing pressure; the second gas lip, however, abuts on the valve stem with no or a substantially smaller sealing pressure.

According to this embodiment, the first gas lip is preferably capable of sealing pressure from the portion of the seal body, which is disposed within the reinforcement support ring, relative to the primary oil lip and therefore, it is designed to apply a relatively large sealing pressure against the valve stem. On the other hand, the second gas lip is not required to absorb any pressure or it absorbs at least only a relatively small pressure and thus, it can be designed so as to apply a relatively small contact pressing force against the valve stem.

This can be realized, for example, according to another embodiment of the inventive valve stem seal by making the diameter of the first seal lip slightly smaller than the diameter of a valve stem associated with the valve stem seal and/or the diameter of the first gas lip is at least 0.1 mm smaller than the diameter of the second gas lip.

The valve stem seal can include, for example, a circular cylindrical-shaped and deformation-resistant reinforcement support ring, in which the seal body is at least partially disposed and which support ring includes a radially-inwardly extending leg, wherein the seal body includes a first portion associated with the leg, a second portion connected to the first portion and disposed outside of the reinforcement support ring and a third portion connected to the first portion and disposed within the reinforcement support ring.

The oil seal assembly preferably can be disposed in the second portion of the seal body, the first gas lip preferably can be disposed in the first portion or in the third portion of the seal body, and the second gas lip preferably can be disposed in the first portion or in the second portion.

Therefore, according to one embodiment of the valve stem seal, friction and wear of the valve stem seal can be reduced by appropriately setting the diameter of the oil lip, of the first gas lip and of the second gas lip, because each individually improves and is directly associated with the functions of oil metering, sealing at low pressures and sealing at high pressures.

According to another embodiment of the valve stem seal, the first gas lip is preferably designed to seal pressure from the portion of the seal body, which is disposed within the reinforcement support ring, with respect to the primary oil lip and thus, it applies a relatively large sealing pressure against the valve stem. On the other hand, the second gas lip is not required to absorb any pressure and thus can be designed so as to apply a relatively low contact pressure against the valve stem.

As a result, a lubrication pocket, i.e. a chamber, in which oil can collect to improve the service life of the valve stem seal and reduce friction, is defined between the first gas lip and the second gas lip. The gas lip substantially completely decouples the primary oil lip from the alternating pressures in the manifold of the internal combustion engine. As a result, the oil lip can also be designed in a friction improved manner for an extended service life with a minimal contact pressing force.

Exemplary embodiments of the invention are illustrated in an exemplary manner in the appended schematic drawings.

DETAILED DESCRIPTION OF THE INVENTION

Figure 1:
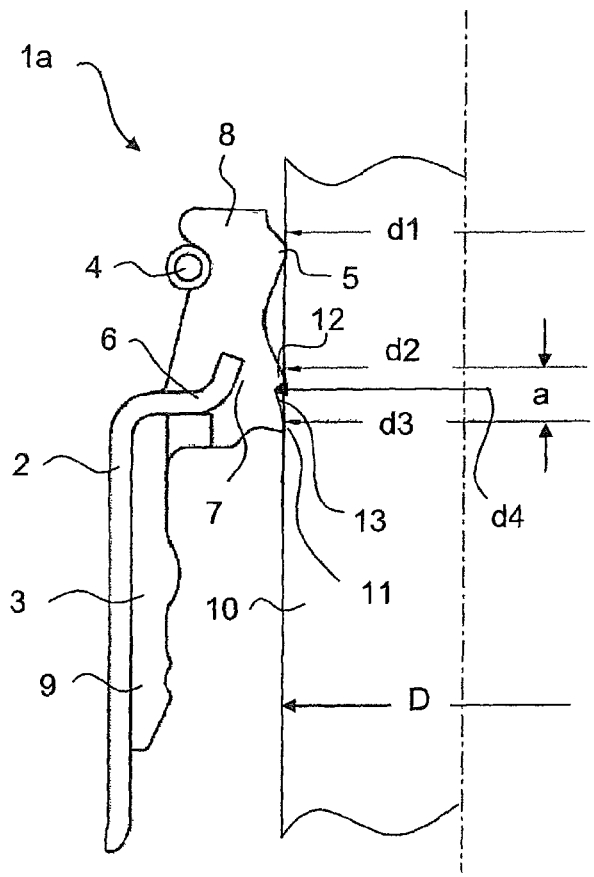
FIG. 1 shows a valve stem seal and
FIG. 2 shows another valve stem seal.
Figure 2:
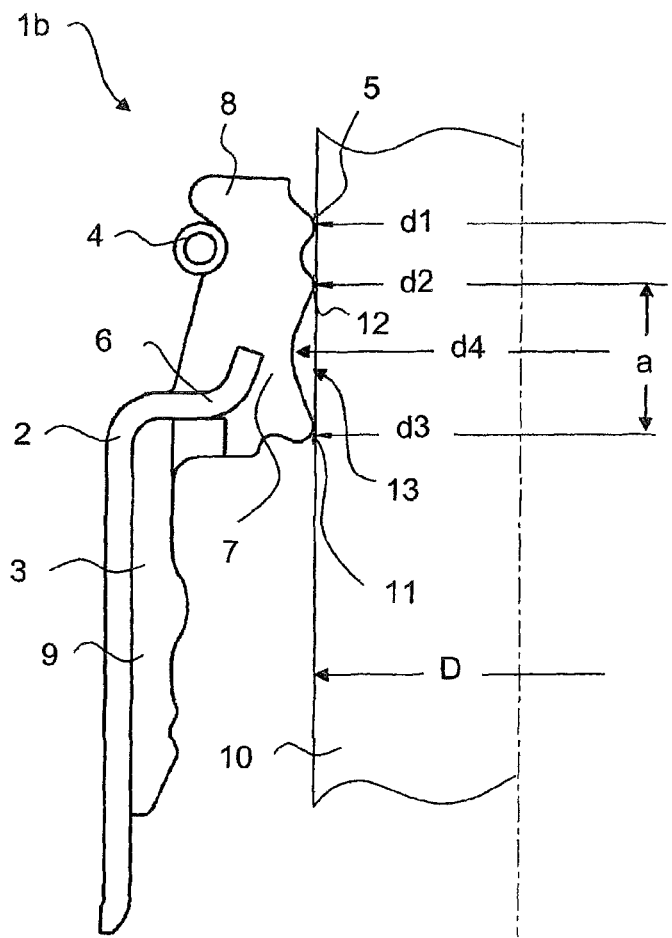

FIG. 1 shows a valve stem seal 1a and FIG. 2 shows an alternative valve stem seal 1b of a valve, in particular for an internal combustion engine. If not otherwise described, then components of the two valve stem seals 1a, 1b, which are structurally and functionally substantially the same, are provided with the same reference numbers.

The valve stem seals 1a, 1b each include an especially deformation-resistant reinforcement support ring 2, an elastomeric seal body 3 and an annular garter spring 4. In the case of the present exemplary embodiment, the seal bodies 3 are affixed to the respective reinforcement support ring 2, e.g., by vulcanization, and each has an oil seal assembly embodied as an oil lip 5 that is directed towards the valve cover side of the internal combustion engine. The oil lips 5 have a diameter d1 and are integrally formed, e.g., as one-piece and in particular from the same material, on the respective seal bodies 3.

In the case of the present exemplary embodiment, the reinforcement support ring 2 includes a leg 6, which is angled radially inwardly and extends into the seal body 3 and in this way forms a pressure-stable portion 7. A portion 8 of the seal body 3 is directed away from the reinforcement support ring 2 and connects to the pressure-stable portion 7. This portion 8 of the seal body 3, on which the garter spring 4 is also affixed, comprises the oil lip 5 and makes possible radial movements of the oil lip 5.

In the case of the present exemplary embodiments, the seal body 3 includes a portion 9 disposed within the reinforcement support ring 2 axially connected to the pressure-stable portion 7; the portion 9 is provided to be fitted onto a not-illustrated valve guide of a valve stem 10 of the valve.

In the case of the present exemplary embodiments, the seal body 3 includes a sealing edge formed in the pressure-stable portion 7 or in the portion 9 of the seal body 3, which directly connects to the pressure-stable portion 7, as a first gas lip 11 having a diameter d3. The first gas lip 11 is integrally formed on the seal body 3, e.g., in one-piece, in particular from the same material.

In the case of the present exemplary embodiments, a second gas lip 12 is integrally formed on the seal body 3 between the first gas lip 11 and the oil lip 5 as a further sealing edge having a diameter d2. The second gas lip 12 is integrally formed, e.g., in one-piece, in particular from the same material, on the pressure-stable portion 7 of the seal body 3 (valve stem seal 1a) or on the portion 8 (valve stem seal 1b), which is located outside of the reinforcement support ring 2.

In the case of the present exemplary embodiments, the first gas lip 11 is spaced from the second gas lip 12 by a distance a, which is in particular between 0.2 mm (valve stem seal 1a) and 1 mm (valve stem seal 1b).

The first gas lip 11 and the second gas lip 11 define a chamber 13 having a maximum diameter d4, which is, e.g., 0.5 mm larger than the diameter d2 of the second gas lip 12.

In the case of the present exemplary embodiments, the diameter d2 of the second gas lip 12 is only slightly smaller than the diameter D of the valve stem 10.

In order to, e.g., reduce the friction between the valve stem seals 1a, 1b and the valve stem 10, the diameter d3 of the first gas lip 11 is at least 0.1 mm less than the diameter d2 of the second gas lip 12.

The first gas lip 11 should seal pressure from the portion 9 of the valve stem seal 1a, 1b relative to the primary oil lip 5 and therefore should exhibit a relatively high sealing pressure against the valve stem 10. On the other hand, the second gas lip 12 is not required to absorb pressure and can thus be designed with a relatively low contact sealing pressure relative to the valve stem 10.

As a result, a lubricant pocket, i.e. the chamber 13, is defined between the first gas lip 11 and the second gas lip 12, in which oil can collect to improve the service life of the valve stem seal 1a, 1b and reduce friction. During engine operation, the oil that collects in the lubrication pocket is continually replaced due to the stroke movement of the valve, so that a reliable lubrication is continuously ensured without thermal or mechanical overload. The gas lip substantially completely decouples the primary oil lip from the alternating pressures in the manifold of the internal combustion engine. As a result, the oil lip can also be designed in a friction improved manner for an extended service life with a minimal contact pressing force.

REFERENCE NUMBER LIST 1a, 1b Valve stem seal
2 Reinforcement support ring
3 Seal body
4 Garter spring
5 Oil lip
6 Leg
7 Pressure-stable portion
8, 9 Portion
10 Valve stem
11, 12 Gas lip
13 Chamber
a distance
d1-d4, D diameter

The invention claimed is:

1. A valve stem seal for an internal combustion engine, comprising:
   a seal body comprising a gas seal assembly axially spaced from an oil seal assembly, the gas seal assembly including a first gas lip and a second gas lip, which is disposed between the oil seal assembly and the first gas lip, and
   a deformation-resistant reinforcement support ring including a radially-inwardly-extending leg,
   wherein the seal body includes:
      a first portion disposed adjacent to the leg,
      a second portion connected with the first portion and disposed outside of the reinforcement support ring, and
      a third portion connected with the first portion and disposed within the reinforcement support ring, and
   wherein the oil seal assembly is disposed in the second portion of the seal body,
   the first gas lip is disposed in one of the first portion and the third portion of the seal body,
   the second gas lip is disposed in one of the first portion and the second portion, and
   the first gas lip and the second gas lip have respective diameters set such that the first gas lip presses against a valve stem associated with the valve stem seal with a relatively large sealing pressure, whereas the second gas lip does not press against the valve stem or presses against the valve stem with a substantially smaller sealing pressure.

2. The valve stem seal according to claim 1, wherein the oil seal assembly is formed as an oil seal lip.

3. The valve stem seal according to claim 1, wherein the first and second gas lips and the oil seal assembly are integrally formed on the seal body in one-piece from the same material.

4. The valve stem seal according to claim 1, wherein the seal body is made of an elastomeric material.

5. The valve stem seal according to claim 1, wherein the first gas lip is axially spaced from the second gas lip by a distance less than or equal to 1 mm.

6. The valve stem seal according to claim 5, wherein the first gas lip is axially spaced from the second gas lip by a distance greater than or equal to 0.2 mm.

7. The valve stem seal according to claim 1, wherein the first gas lip and the second gas lip define a chamber having a maximum diameter, which is about 0.2 mm to 1 mm greater than the diameter of the second gas lip.

8. The valve stem seal according to claim 1, wherein the diameter of the second gas lip is slightly smaller than the diameter of the valve stem.

9. The valve stem seal according to claim 8, wherein the diameter of the first gas lip is at least 0.1 mm less than the diameter of the second gas lip.

10. The valve stem seal according to claim 9, wherein:
the oil seal assembly is formed as an oil seal lip;
the first and second gas lips and the oil seal lip are integrally formed on the seal body in one-piece from an elastomeric material,
the first gas lip is axially spaced from the second gas lip by a distance between about 0.2 and 1 mm, and
the first gas lip and the second gas lip define a lubricant chamber having a maximum diameter, which is about 0.2 mm to 1 mm greater than the diameter of the second gas lip.

11. A valve stem seal for an internal combustion engine, comprising:
an at least substantially annular seal body comprising a gas seal assembly spaced from an an at least substantially annular oil seal lip in an axial direction of the valve stem seal, the gas seal assembly including an at least substantially annular first gas lip and an at least substantially annular second gas lip disposed between the oil seal lip and the first gas lip, the first and second gas lips defining an at least substantially annular lubricant pocket therebetween,
an at least substantially rigid reinforcement support ring including a radially-inwardly-extending leg, the seal body being affixed to the support ring such that a first portion of the seal body contacts the leg, a second portion of the seal body is connected with the first portion and extends beyond the support ring in the axial direction, and a third portion of the seal body is connected with the first portion and is disposed within the reinforcement support ring,
a garter spring disposed around the second portion of the seal body, and
wherein the oil seal lip is disposed on the second portion of the seal body,
the first gas lip is disposed on one of the first portion and the third portion of the seal body,
the second gas lip is disposed on one of the first portion and the second portion, and
the first gas lip and the second gas lip have respective diameters set such that the first gas lip presses against a valve stem associated with the valve stem seal with a relatively large sealing pressure, whereas the second gas lip does not press against the valve stem or presses against the valve stem with a substantially smaller sealing pressure.

12. The valve stem seal according to claim 11, wherein the oil seal lip, the first gas lip and the second gas lip are integrally formed on the seal body in one-piece from an elastomeric material.

13. The valve stem seal according to claim 12, wherein the first gas lip is axially spaced from the second gas lip by a distance less than or equal to 1 mm.

14. The valve stem seal according to claim 13, wherein the first gas lip is axially spaced from the second gas lip by a distance greater than or equal to 0.2 mm.

15. The valve stem seal according to claim 14, wherein the lubrication chamber has a maximum diameter that is about 0.2 mm to 1 mm greater than the diameter of the second gas lip.

16. A valve assembly comprising:
the valve stem, and
the valve stem seal of claim 15 disposed around the valve stem.

17. The valve assembly according to claim 15, wherein the diameter of the second gas lip is slightly smaller than the diameter of the valve stem and the diameter of the first gas lip is at least 0.1 mm less than the diameter of the second gas lip.

18. A valve assembly comprising:
the valve stem, and
the valve stem seal of claim 11 disposed around the valve stem,
wherein the diameter of the second gas lip is slightly smaller than the diameter of the valve stem and the diameter of the first gas lip is at least 0.1 mm less than the diameter of the second gas lip.

* * * * *